June 25, 1963  J. P. MEDLOCK  3,095,044
VARIABLE PITCH BOAT PROPELLER AND SHEAR PIN TOOL THEREFOR
Filed Sept. 25, 1959  2 Sheets-Sheet 1
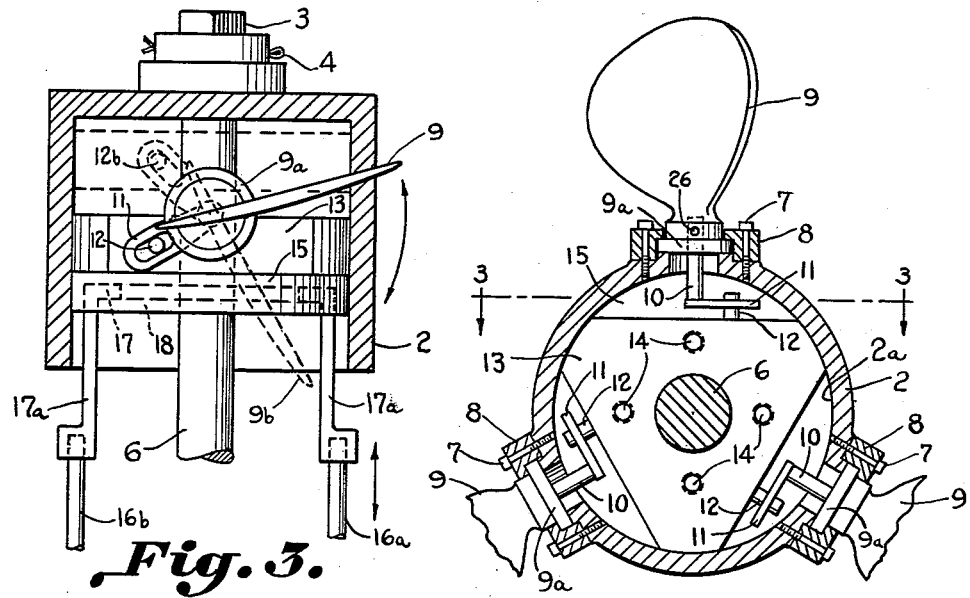
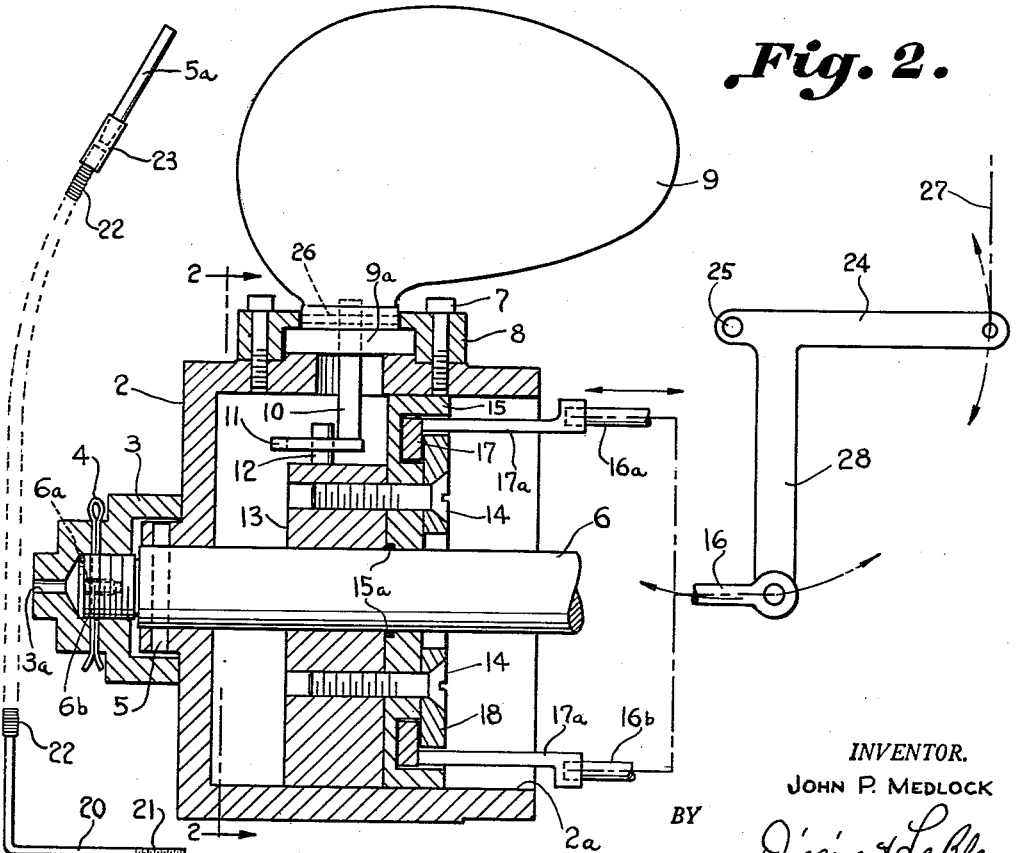
INVENTOR.
JOHN P. MEDLOCK
BY
Diggins & LeBlanc
ATTORNEYS June 25, 1963
J. P. MEDLOCK
3,095,044
VARIABLE PITCH BOAT PROPELLER AND SHEAR PIN TOOL THEREFOR
Filed Sept. 25, 1959
2 Sheets-Sheet 2
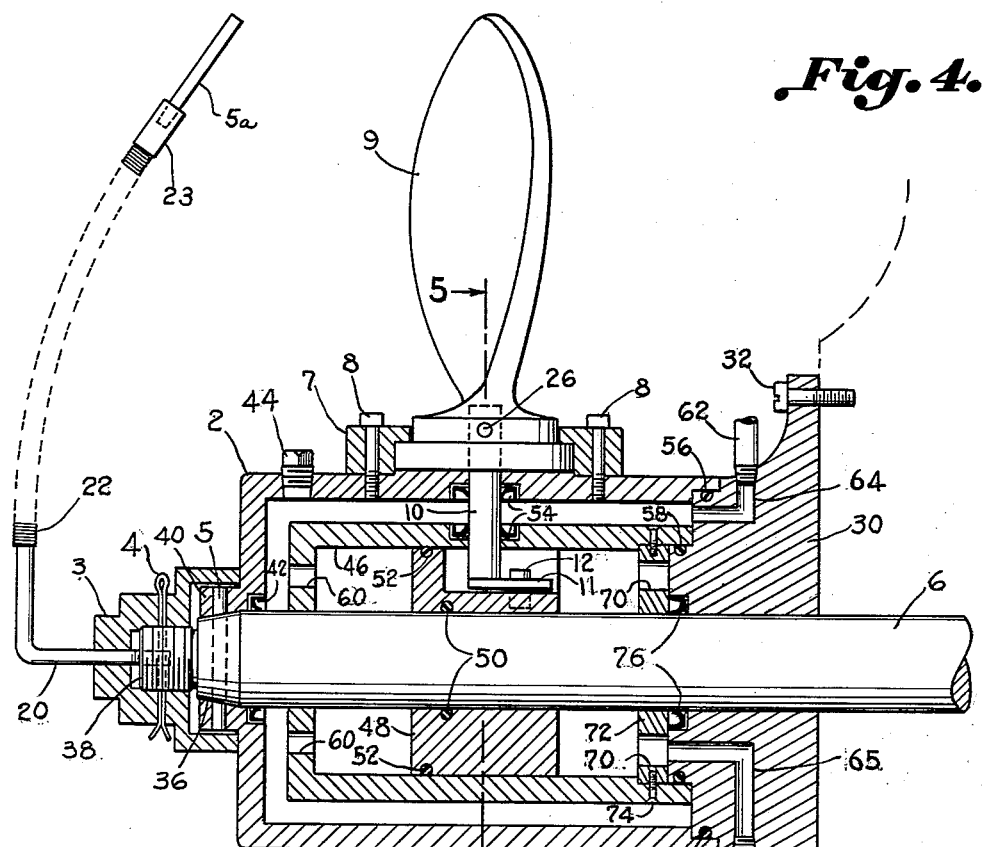
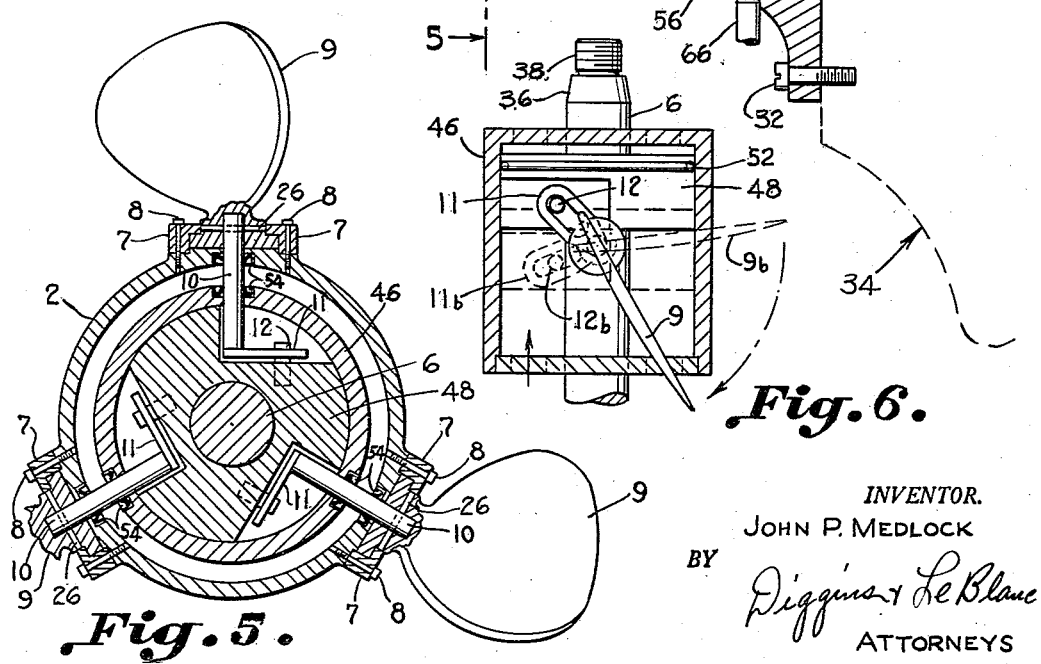
INVENTOR.
JOHN P. MEDLOCK
BY
Diggins y LeBlanc
ATTORNEYS United States Patent Office 3,095,044
Patented June 25, 1963

3,095,044
VARIABLE PITCH BOAT PROPELLER AND SHEAR PIN TOOL THEREFOR
John P. Medlock, Rte. 2, Taylors, S.C.
Filed Sept. 25, 1959, Ser. No. 842,238
1 Claim. (Cl. 170—160.32)

This invention relates to a motor boat propeller assembly and in particular relates to a variable and reversible pitch propeller assembly for a boat and a shear pin tool used in the replacement of a fractured shear pin.

Variable pitch boat propeller assemblies have been devised in the past which have utilized fairly insubstantial and inadequate means for transmitting and translating the linear motion of a control cable into an oscillating motion for the propellers in order to adjust their pitch. One principal shortcoming of these assemblies has been the tendency of the transmitting members to cant or jam in the course of the change of pitch operation. This can result in one of two undesirable conditions. That is, either no change or pitch is imparted to the propellers, or, in some constructions, a different pitch adjustment is brought about for the individual blades. When the latter condition results, the control of the boat becomes uncertain and somewhat unpredictable.

The novel construction of the present invention eliminates the foregoing deficiencies in providing a reliable transmission and translation of the linear motion of the control cable to effect an identical change of pitch to each propeller blade. Furthermore, it permits the operator or pilot to change the speed of the boat by controlling the pitch of the propeller and obtain economy of operation in a reliable and easily operated manner. The blade assembly has been modified to permit the introduction of a novel shear pin tool which greatly facilitates the replacement of a broken shear pin.

As is well known, the purpose of the shear pin is to provide a frangible or rupturable member which will be sheared off whenever the propeller blades strike a foreign object in the water thereby protecting the blades from undue damage. In the past, a great deal of difficulty has been experienced in replacing a fractured shear pin. In the first place, the conditions under which the replacement occurs are far from ideal because when a shear pin has been fractured, it is necessary to reach into the water and remove the propeller nut, drive out the old shear pin, replace the broken pin with a new shear pin, and then replace the propeller nut. Under the adverse environmental conditions described, it is unfortunately very common to drop either or both the propeller nut and the shear pin into the water thereby losing them. Although the loss of the propeller nut is more annoying than serious, if the shear pin is lost, it means that the pilot is stranded unless he has had the foresight to bring more than a single spare shear pin with him.

In the use of the novel tool of the present invention, both the propeller nut and the spare shear pin are retained in such a manner as to prevent them from being lost.

Two embodiments illustrating different methods for moving an inner-reciprocable member are presented. In one form a purely mechanical linkage is used to effect the desired change of pitch for the propeller blades. In the other form, a hydraulic system is utilized for the same purpose. Each form of the invention utilizes the identical connection to the propeller blades which transforms reciprocal motion into oscillatory motion in an extremely efficient manner without canting or jamming of the inner reciprocable member.

Accordingly, it is a primary object of the present invention to provide a connection to the propellers of a motor boat that may be actuated either mechanically or hydraulically.

It is another object of the present invention to provide a variable pitch boat propeller assembly adapted for use with either outboard or inboard motors.

It is another object of the present invention to permit a change of pitch for the propellers of a motor boat by members which are not subject to canting and jamming.

It is another object of the present invention to provide a variable pitch boat propeller assembly which is capable of controlling the pitch of a propeller from zero to maximum in both forward and reverse directions.

It is still another object of the present invention to provide a novel shear pin tool which permits replacement of a shear pin in a manner which prevents both the new shear pin and the propeller nut for the motor boat shaft from being dropped into the water and lost.

These and further objects and advantages of the present invention shall become more apparent upon reference to the following specification and claim and appended drawings wherein:

FIGURE 1 is a fragmentary vertical view partially in section of a variable pitch propeller blade assembly according to one form of the invention with a shear pin tool used in connection therewith;

FIGURE 2 is a sectional view taken along the line 2—2 of FIGURE 1;

FIGURE 3 is a sectional view taken along the line 3—3 of FIGURE 2;

FIGURE 4 is a fragmentary vertical view partially in section of another form of a variable pitch propeller blade assembly with a shear pin tool used in connection therewith;

FIGURE 5 is a sectional view taken along line 5—5 of FIGURE 4; and

FIGURE 6 is a fragmentary plan view partially in section showing two pitch positions.

Referring now to FIGURE 1, a shaft is indicated at 6 adapted to be driven by a motor boat in customary fashion. A propeller nut 3 threadedly engages external threads 6b on shaft 6. A cotter pin 4 is inserted through a bore in propeller nut 3 and shaft 6 to maintain the nut in position. A shear pin 5 interconnects a reduced diameter portion of an outer casing 2 with the motor shaft 6 and is easily rupturable or frangible in nature so as to protect the propeller blades 9 in the event that they come in contact with any debris or other obstruction.

Reference is now made to the shear pin tool which has an L-shaped member 20 threaded at 21. A coiled spring 22 frictionally engages the other end of L-shaped member 20 and is frictionally received within one end of an adapter 23. A spare shear pin 5a is shown frictionally received within the other end of adapter 23. It will be appreciated that the coil spring member 22 could be any flexible member and may include plastic materials such as polyethylene, for example, and that the threads 21 could take the form of an Allen-type wrench thread.

In order to use the shear pin tool effectively, several modifications to the propeller assembly in the vicinity of the rear end of the motor shaft are required. For example, the propeller nut 3 is provided with a clearance hole 3a and the end of shaft 6 is provided with internal threads 6a which mate with the threads 21 on the L-shaped member 20.

In the operation of the shear pin tool, the threaded end 21 of the L-shaped member 20 is inserted through clearance hole 3a and threaded into internal threads 6a in the end of shaft 6. With the cotter pin 4 removed, the propeller nut 3 is unscrewed and retained in the bight of the L-shaped member 20. The fractured shear pin 5 may then be driven out of the shaft 6 and outer casing 2 by any suitable means. The coil spring 22 is then bent substantially in two and the spare shear pin 5a is inserted into the aligned holes in the outer casing 2 and shaft 6 before its removal from adapter 23. With the new shear pin 5a in position, the propeller nut 3 is removed from the bight of the L-shaped member 20 and threaded into the outer casing 2. The shear pin tool is then unscrewed from the end of shaft 6 and a new cotter pin 4 inserted through propeller nut 3 and shaft 6. Thus, it is apparent that there is no possibility of losing either the new shear pin 5a or the propeller nut 3.

Continuing now with the description of the variable pitch propeller assembly of FIGURE 1, a reciprocable piston-like member 13 is received within a bore 2a in outer casing 2. Mounted flush with reciprocable member 13 is an outer ring 15. A grease wiping seal is shown at 15a between ring 15 and the shaft 6. The ring 15 is provided with an annular recess to receive a friction ring 17. An outer plate 18 overlies the friction ring 17 flush with outer ring 15 and a series of screws 14 are used to provide an integral assembly of the members 13, 15 and 18. The outer ring 15 is of the same diameter as the bore in outer casing 2 whereas the reciprocable member 13 makes a three position sector contact with the bore in outer casing 2 as best seen in FIGURE 2.

Referring now to FIGURE 2, the reciprocable member 13 is shown to be provided with three flat surfaces each having a stud 12 projecting therefrom. Three identical connections are made between the reciprocal member 13 and the propeller blades 9. Each connection comprises a bell crank member consisting of slotted leg 11 parallel to the flat surface on the reciprocable member 13 and another leg 10 extending at right angles thereto and into the shank portion of each of the propeller blades 9. Each of the studs 12 extends through the slotted portion in the leg 11 of the bell crank members and forms a driving connection thereto. A pin 26 extends transversely through the shank portion of the propeller blades 9 to secure the leg 10 to the respective propeller blade.

Each propeller blade 9 has its shank portion provided with an outwardly extending flange 9a. Split ring members 8 engage the outwardly extending flange and secure the propellers to a raised boss on the outer casing 2. Bolts 7 are used to attach the split ring members to the outer casing 2.

Adjustment rods 17a are secured in the friction ring 17 and are further attached to rods 16a which in turn are controlled by rod 16 of a split yoke. A bell crank is pivoted at 25 to the frame of the boat (not shown) and the legs 24 and 28 are oscillated by a control cable indicated in phantom at 27. Control cable 27 is in turn connected to the control box in the boat in the customary fashion for oscillating the legs 24 and 28 of the bell crank to cause reciprocation of reciprocable member 13 as indicated by the arrows in FIGURE 1.

In the operation of the variable pitch propeller assembly as shown in FIGURES 1–3, the operator controls a lever in the control box the motion of which is transmitted through the cable 27 to oscillate the legs 24 and 28 of the bell crank. This motion is transmitted through rod 16 of the split yoke and adjusting rods 16a, 16b and 17a to the friction ring 17 of the inner reciprocable assembly. Motion of this assembly carries with it the studs 12 which extend through the slotted leg 11 of the bell crank and which motion is imparted to the propeller blades 9 through legs 10 and pins 26. The solid and phantom lines in FIGURE 3 illustrate two different positions for the propeller blade 9. The reference numerals 12 and 9 designate one position of the stud and propeller respectively and the reference numerals 12b and 9b designate a second position for the same stud and propeller blade. The motion between these positions is designated by the arrows in FIGURE 3.

Referring now to FIGURE 4, there is shown another embodiment of the present invention in which a hydraulic system controls the position of the blades. In this embodiment, a bearing cap 30 is secured by screws 32 to the lower portion of a housing for an outboard motor indicated generally at 34. A shaft 6 generally similar to that shown in the previous embodiment extends through the lower portion 34 and bearing cap 30 but is slightly modified in that it has a tapered portion 36 to receive the shear pin 5. This shaft has an externally threaded end 38 as in the previous embodiment. The propeller nut 3 threadedly engages the external threads 38. The shear pin tool is shown to extend through the propeller nut 3 into the end of shaft 6.

The outer housing 2 is generally similar to that shown in the previous embodiment but is provided with a tapered end 40 which mates with the corresponding tapered portion 36 on the shaft 6. In this embodiment of the invention, an oil seal 42 is provided between the shaft 6 and outer housing 2. An oil fill screw is shown at 44 in the outer housing 2.

A hollow inner housing is shown at 46 within which a piston 48 reciprocates. An O-ring 50 establishes an oil seal between the piston 48 and the shaft 6 and a similar O-ring 52 provides an oil seal between the piston and the inner casing 46.

Three substantially L-shaped recesses are provided in the piston 48 for the propeller actuating assemblies which are substantially the same as shown in the previous embodiment. Thus, in each connection to the propellers a stud 12 extends through the slotted leg 11 of the bell crank and the other leg 10 extends into the propeller 9. A pin 26 extends transversely through the shank of each of the propellers through the leg 10. Oil seals are shown at 54 between the leg 10 and each of the outer and inner housings. An O-ring is provided at 56 between the outer casing 2 and bearing cap 30. Similarly, an O-ring 58 is provided between the inner housing 46 and bearing cap 30. A series of ports 60 is provided in the inner housing 46 near the tapered end of the shaft 6 to admit oil around the shaft 6 on one side of piston 48. This oil is supplied through an oil line 62 the source of which is in the motor boat and oil line 64 in bearing cap 30. Oil is admitted to the other side through an oil line 66 whose source is in the motor boat and an oil line 65 through bearing cap 30 which communicates with one of a series of slotted ports 70 in an outer plate 72. This outer plate 72 is secured to the inner housing 46 by screws 74. An oil seal between the bearing cap and the shaft 6 is shown at 76.

In the operation of this embodiment of the invention, the oil pressure on either side of piston 48 is varied in accordance with a desired setting for the propellers 9 by suitable valve control means in the motor boat for oil lines 62 and 66. Reciprocation of piston 48 is transformed into oscillatory motion by the legs 10 and 11 of the bell crank and imparted to the propellers by way of the pins 26 as in the previous embodiment. Two positions for one of the propeller blades is indicated in FIGURE 6. One position for the blade and stud is indicated by the numerals 9 and 12 respectively while a second position for these members is designated by numerals 9b and 12b. In order to move the piston 48 rearwardly in the inner casing 46, the pressure in oil line 62 is increased and this increase in pressure is reflected by way of the oil through the space between the outer casing 2 and inner casing 46 and through the series of ports 60 to the face of piston 48. Conversely, to move the piston 48 forwardly within the inner casing 46, the pressure in oil line 66 is increased and this increased pressure in the oil is passed through the oil line 65 in bearing cap 30 through the series of ports 70 to the other side of piston 48.

It will be apparent from the foregoing description that the propeller blade assembly may be adjusted from a maximum forward driving position to a maximum reverse position as well as any intermediate position either mechanically or hydraulically. Another feature of the present invention is that by using a cylindrical inner reciprocable member, the actuating force may be delivered to the propellers without canting or jamming of the transmission members.

Although the invention has been described principally with respect to an outboard motor, it will be apparent that it is equally well adaptable to an inboard motor. The modification required for the end of the motor shaft and propeller nut to permit the insertion of a novel shear pin tool provides a unique adjunct to the present invention and one which can conceivably make the fracture of the shear pin a less harrowing experience by insuring that the spare shear pin and propeller nut will not be lost.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A variable pitch propeller assembly for a motor boat, comprising a rotatable motor boat shaft, a first cylindrical housing being concentric with the motor boat shaft, one end of the housing being coupled to the shaft, the opposite end of the housing being journalled on a bearing cap, a second cylindrical housing being concentric with and coupled to the shaft, the second housing being spaced inwardly of the first housing to form therewith an annular chamber, one end of the second housing being spaced inwardly of one end of the first housing and having a plurality of ports, the opposite end of said housing being journalled on the bearing cap, piston means mounted on the shaft within the second housing, said piston means being rotatable with the shaft and slidable relative thereto, a plurality of propeller blades mounted on the first housing for rotation therewith, a plurality of bell crank members, each having one lever secured to one of said blades, the other lever of each bell crank member being formed with a slot, studs projecting from the piston means through the slotted portion of each bell crank member, whereby reciprocation of the piston means causes a corresponding change of pitch in each of the propeller blades, and a pair of conduits formed in the bearing cap for conveying hydraulic fluid to the second housing to thereby actuate the piston means, one conduit communicating with the annular chamber and one end of the second housing and the other conduit communicating with the opposite end of the second housing, whereby the increase in fluid pressure in one conduit causes the piston means to slide in one direction and the increase in fluid pressure in the other conduit causes the piston to slide in the opposite direction.

References Cited in the file of this patent

UNITED STATES PATENTS

| | | |
|---|---|---|
| 810,032 | Brown | Jan. 16, 1901 |
| 885,038 | Gnaegy | Apr. 21, 1908 |
| 954,539 | Pawlik | Apr. 12, 1910 |
| 1,803,858 | MacClatchie | May 5, 1931 |
| 2,111,245 | Irgens | Mar. 15, 1938 |
| 2,188,313 | Ruths et al. | Jan. 30, 1940 |
| 2,253,013 | Birch | Aug. 19, 1941 |
| 2,274,334 | Keller | Feb. 24, 1942 |
| 2,377,386 | Stalker | June 5, 1945 |
| 2,387,545 | Veney | Oct. 23, 1945 |
| 2,470,309 | Hepp | May 17, 1949 |
| 2,539,339 | Stephanoff | Jan. 23, 1951 |
| 2,625,998 | Berninger et al. | Jan. 20, 1953 |
| 2,704,991 | Danielson | Mar. 29, 1955 |
| 2,763,329 | Feroy | Sept. 18, 1956 |
| 2,794,508 | Pehrsson et al. | June 4, 1957 |

FOREIGN PATENTS

| | | |
|---|---|---|
| 909,471 | France | Dec. 20, 1945 |